Patented May 8, 1934

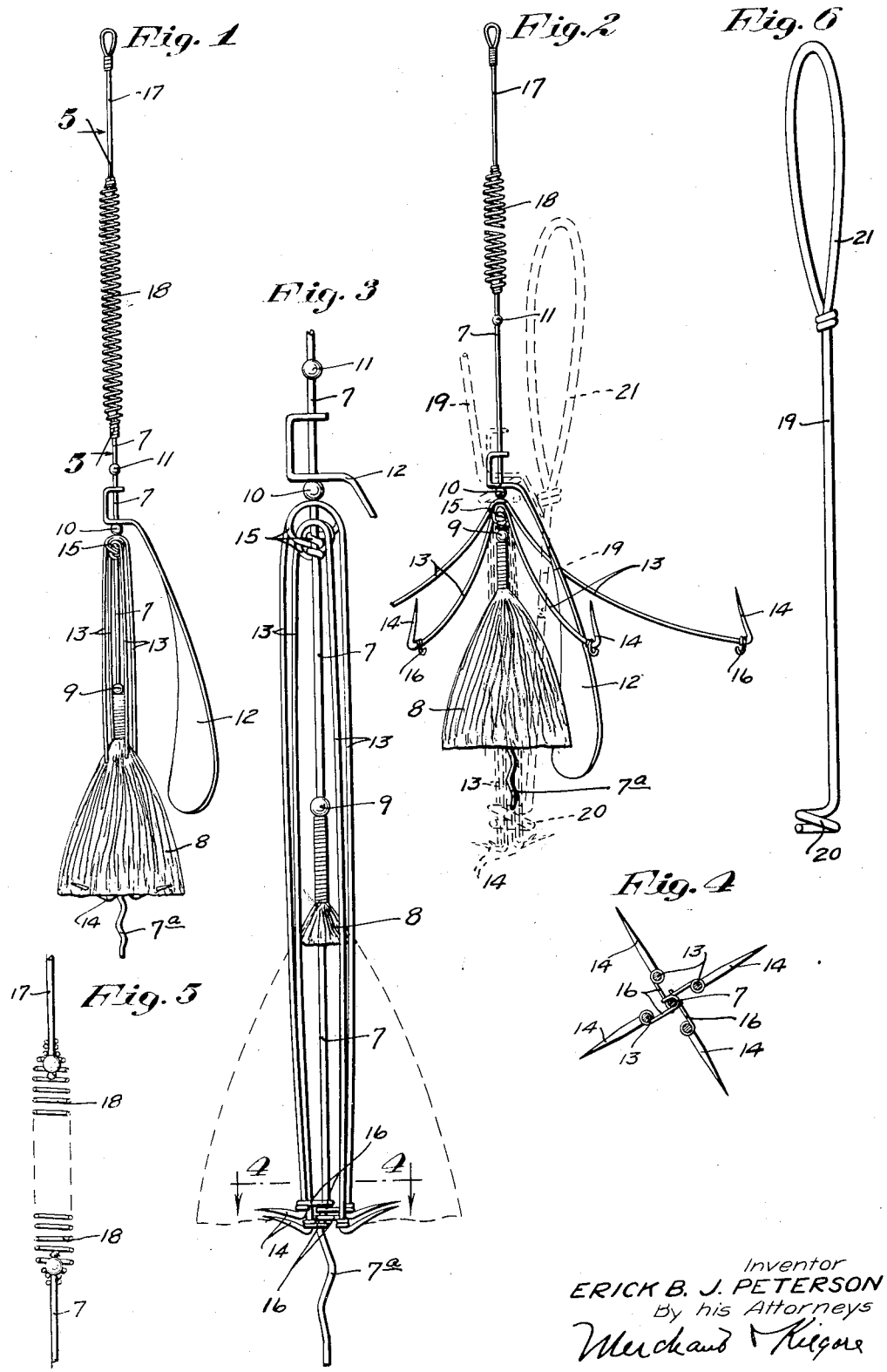

1,957,799

UNITED STATES PATENT OFFICE 1,957,799

ARTIFICIAL FISH BAIT

Erick B. J. Peterson, Minneapolis, Minn.

Application March 14, 1932, Serial No. 598,560

1 Claim. (Cl. 43—36)

My invention provides an improved and highly efficient artificial fish bait and, generally stated, consists of the novel devices, combinations of devices and arrangement of parts hereinafter described and defined in the claims. As an important feature, the complete bait involves a plurality of barb-equipped spring arms or hooks, under spring tension to fly apart and outward, but normally restrained and combined with a tripping means for releasing and setting the same into action under initial pull produced by a fish grabbing the bait.

In the accompanying drawing, which illustrates the improved bait, like characters indicate like parts throughout the several views.

Referring to the drawing:

Fig. 1 shows the improved bait set for use;

Fig. 2 by full lines shows the trip bait;

Fig. 3 is an enlarged view corresponding to Fig. 1, but with some parts removed and some parts indicated by dotted lines only;

Fig. 4 is a transverse section taken on the line 4—4 of Fig. 3;

Fig. 5 is a section taken on the line 5—5 of Fig. 1; and

Fig. 6 is an elevation showing a tool used in the setting of the bait.

The numeral 7 indicates an axially arranged trip rod preferably in the form of quite heavy wire, to the intermediate portion of which is secured a fibrous tuft 8. At different points, the rod 7 is provided with enlargements or ball-like stops 9, 10, and 11. A spoon 12 is rotatably mounted on the rod 7 between the stops 10 and 11. The bait, as shown, comprises four barb-equipped spring-acting arms or hooks 13 provided at their free ends with outwardly projecting barbs 14. These four hooks are preferably formed from two pieces of spring steel wire such as piano wire, coiled around the rod 7 and interwoven as indicated at 15 so that the four hooks will be spaced apart circumferentially about ninety degrees and are free to slide up and down on the rod 7 between the stops 9 and 10. At their barbed ends, the spring-acting hooks 13 are provided with inwardly projecting preferably rigidly secured latches 16 formed with open-sided links, the hook-like inner ends of which are adapted to be hooked onto the lower portion of the trip rod 7. Here it should be noted that the trip rod 7 at its lower portion is preferably crooked or made zig-zag, as shown at 7ᵃ, so that there will be increased frictional resistance to upward movement of the trip rod through the hooked ends of the latches 16 when the latter are applied thereto as shown in Figs. 1 and 3.

To relieve the bait and the line from shocks, the upper end of the trip rod 7 is preferably connected to the lead 17 through a coiled spring 18 connected thereto preferably as best shown in Fig. 5, but also in Fig. 1. By full lines in Fig. 6 and by dotted lines in Fig. 2, I have shown a tool that is very useful both in setting the bait and in removing the bait from the mouth of the fish caught on the hooks. This tool comprises a heavy wire or rod-like stem 19 provided at one end with an open coil 20 and at its other end with a hand-piece 21. It is important to note that the ball-like stop 10 is slidably mounted on the trip rod 7 so that the spoon 12, as well as the hooks can slide upwardly and downwardly on said rod and can be set variable distances from the bent lower end 7ᵃ of said trip rod.

When the device is to be set for use, the several spring-acting hooks 13 must be pressed inward and their latches 16 hooked onto the trip rod 7 while said rod 7 is forced downward with its lower end below the barbs, see particularly Figs. 1 and 3. When the hooks are thus retracted, they are put under considerable spring tension which will cause them to fly outward instantly when released from the rod 7. Also when the hooks are to be released from the mouth of a fish, they must be retracted. As a convenient device for retracting the hooks for the purpose of setting the bait or for releasing the hooks from the mouth of a fish, the tool shown by full lines in Fig. 6 and by dotted lines in Fig. 2 is a very desirable device. To apply the tool, its spiral end 20 is screwed around the rod 7 just above the upper secured portions of the several hooks 13 and then the said coil is forced downward to the lowest position indicated by dotted lines in Fig. 2. This holds the several hooks drawn together so that their latches 16 can be readily hooked onto the trip rod 7 and after this has been done, the coil 20 is simply unscrewed off from the free ends of the hooks 13. Figs. 1 and 3 show the bait set for use, in which position the tuft 8 will be drawn down over the barbs of the several hooks and the stop 9 will be far below the attached ends of the several hooks. The friction between the latches 16 and the trip rod 7 will tend to hold the several hooks in their relatively raised positions shown in Figs. 1 and 3. This friction resistance to sliding movement of the hooks downward on the trip rod is further increased by bending the lower end 7ᵃ of the trip rod, as shown. The farther the latches 16 are set up on the bent end 7ª, of said trip rod, the greater will be the downward movement required to trip the bait. By reference particularly to Fig. 4, it will be noted that the bent ends of the latches 16 that are in alignment, are offset or bent reversely to facilitate ready connection between the same and the trip rod.

When a fish engages any one of the gathered or retracted bars 14 and exerts an initial downward pull, the hooks will lower on the trip rod and the end 7ª of the said trip rod will be raised above the latches 16, thereby releasing the several hooks and allowing them to fly out in the four different directions and catch the mouth of the fish at four different places. The hooks will maintain their engagement with the mouth of the fish and will not release their grip under any kind of opening and closing movements of the fish's mouth. In practice, I have found that it is not necessary to provide the anchoring barbs usually provided on fish hooks, because of the above noted fact that the hooks 13 will yield and maintain any engagement that they once get with the mouth of the fish.

In actual use, this fish hook has been found highly efficient for the purposes stated. A preferred form has been illustrated, but the bait is, of course, capable of various modifications as to details of construction and arrangement of parts within the scope of the invention herein disclosed and claimed.

What I claim is:

An artificial bait comprising a longitudinally extended axial trip rod arranged for connection to a line, an outwardly spring pressed hook mounted for limited sliding movement on said trip rod, a latch device connecting said hook to said trip rod to hold the former in retracted position, endwise movement of said hook on said trip rod serving to completely and instantaneously release said hook and permit the same to spring outward, said trip rod, at its lower end, being formed with an irregular or distorted retarding surface operative to increase the frictional engagement thereof with said latch device.

ERICK B. J. PETERSON.